June 20, 1972  D. W. TIBBETS  3,671,117
VIEWING DEVICE
Filed Sept. 14, 1970  2 Sheets-Sheet 1
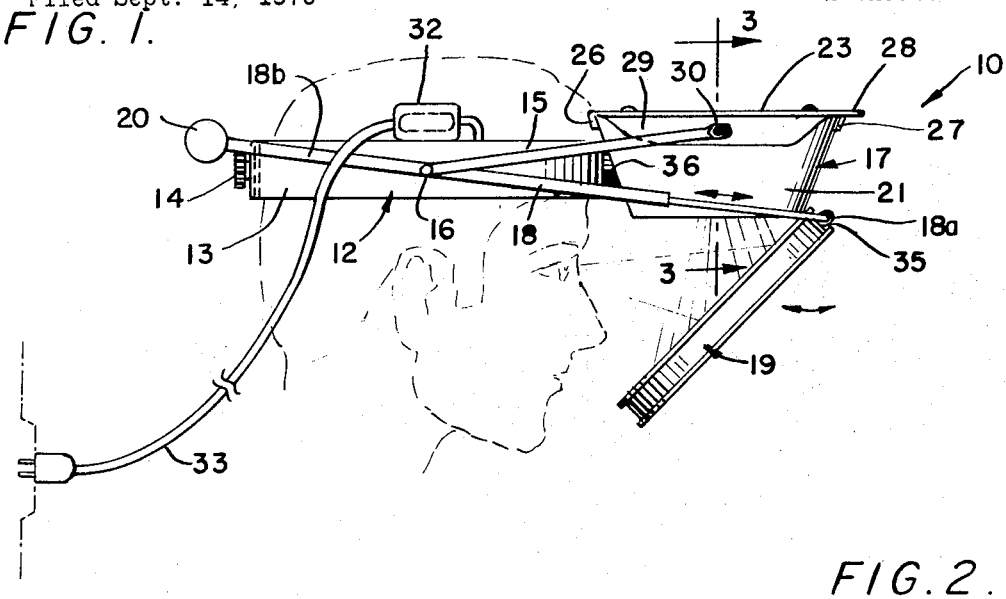
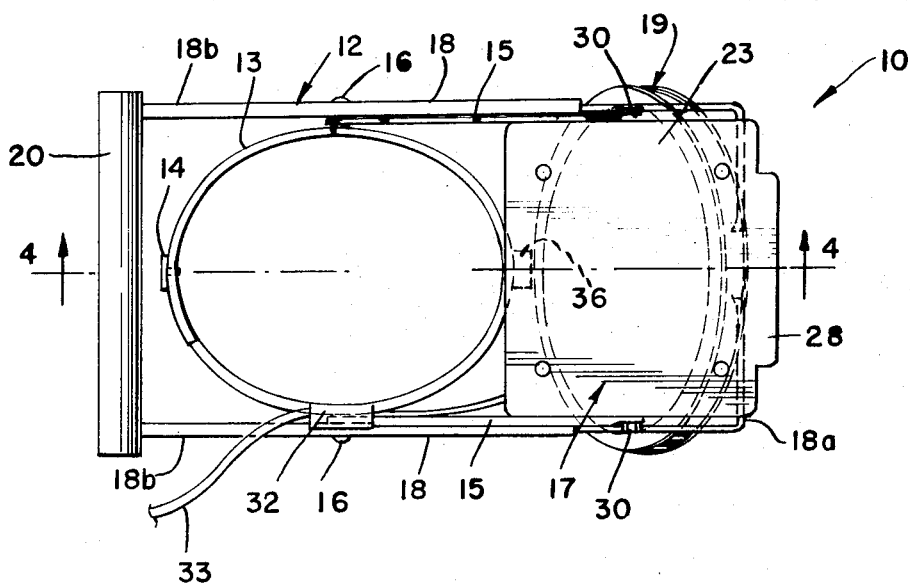
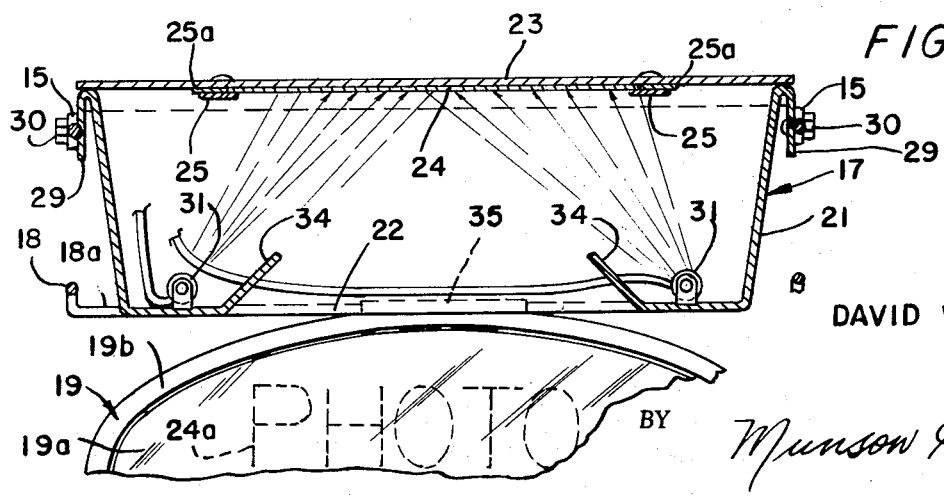
INVENTOR
DAVID W. TIBBETS
BY Munson H. Lane
ATTORNEY June 20, 1972   D. W. TIBBETS   3,671,117
VIEWING DEVICE
Filed Sept. 14, 1970   2 Sheets-Sheet 2
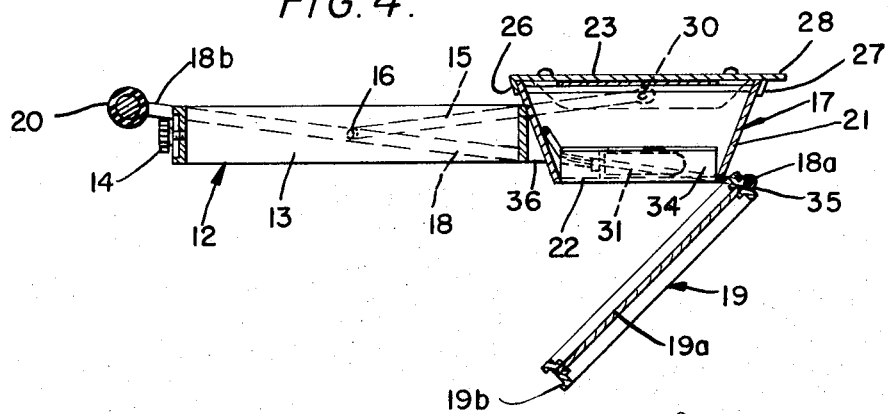
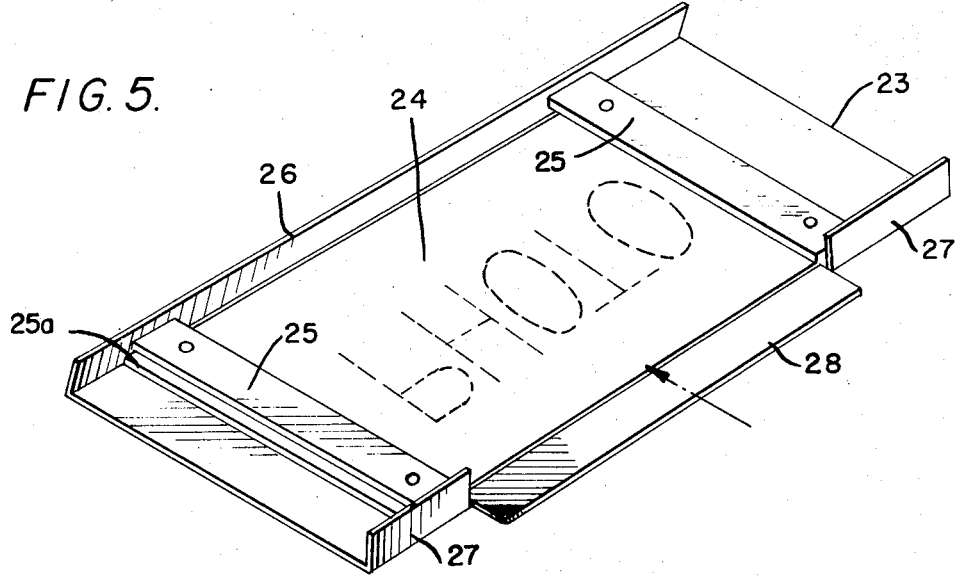
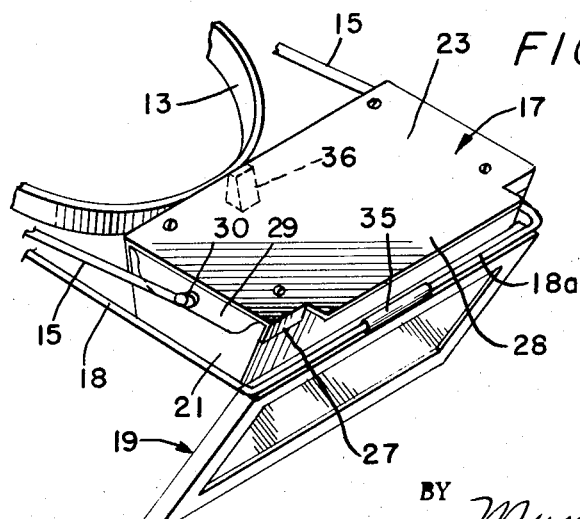
INVENTOR
DAVID W. TIBBETS
BY Munson H. Lane
ATTORNEY

United States Patent Office 3,671,117
Patented June 20, 1972

3,671,117
VIEWING DEVICE
David W. Tibbets, 7850 Lime Grove Ave.,
West Melbourne, Fla. 32901
Filed Sept. 14, 1970, Ser. No. 71,642
Int. Cl. G03b *21/00, 21/06, 21/26*
U.S. Cl. 353—28                    7 Claims

ABSTRACT OF THE DISCLOSURE

A supporting frame positioned on the head of a viewer carries a transparent reflecting screen and an episcope type projector which includes a holder for an object to be viewed and illuminating means, arranged so that an image of the object is projected on the screen. An inclination-responsive switch in circuit with the illuminating means energizes the latter only when the viewer's head is level, and de-energizes the same when the viewer's head is tilted forwardly and downwardly for viewing another object in coordination with the projected image.

---

This invention relates to new and useful improvements in the art of optical apparatus, and in particular the invention concerns itself with a device for viewing an image of an object projected on a transparent reflecting screen, the principal endeavor of the invention being to provide apparatus of this type which may be conveniently and effectively employed for coordinated viewing of an object which has its image projected on the screen and an object which is directly visible through the transparent reflecting screen.

In the context of the invention, viewings of an object image on the screen and of another object visible directly through the screen are undertaken alternately or successively, and as such these viewings may be utilized either for comparison purposes, such as for example in comparing one picture or a drawing with another, or for complemental purposes, such as for example in coordinating a picture or a drawing with a specification or some other related text.

In carrying out its principal endeavor, the invention provides an episcope type projector and a transparent reflecting screen, both carried by a supporting frame which is positionable on the head of a viewer so that an image of an object placed in a holder of the projector appears on the screen in optical alignment with the viewer's line of vision. The object in the holder of the projector is illuminated while the viewer's head is substantially level, but the illumination is de-energized when the viewer tilts his head forwardly and downwardly in order to view, directly through the screen, another object which is to be compared, complemented or otherwise related to the projected image. In this manner the projected image and the directly viewed object may be brought into view alternately or successively by mere tilting of the user's head, and a comparison, complementing or other such relationship of the projected image and directly viewed object is greatly facilitated.

The viewing device of the invention is simple in construction, efficient and dependable in operation, and lends itself to economical manufacture.

With the foregoing more important object and features in view and such other objects and features which may become apparent as this specification proceeds, the invention will be understood from the following description taken in conjunction with the accompanying drawings, wherein like characters of reference designate like parts and wherein:

FIG. 1 is a side elevational view of the device of the invention in situ on a user's head;

FIG. 2 is a top plan view of the device per se;

FIG. 3 is an enlarged, fragmentary sectional view, taken substantially in the plane of the line 3—3 in FIG. 1;

FIG. 4 is a vertical sectional view, taken substantially in the plane of the line 4—4 in FIG. 2;

FIG. 5 is an underside perspective view of the holder; and

FIG. 6 is a fragmentary perspective view of the device.

Referring now to the accompanying drawings in detail, the viewing device of the invention is designated generally by the reference numeral 10 and comprises a supporting frame 12 including a headband 13 whereby the entire device may be positioned on the head of a user, as shown in FIG. 1. The headband may have overlapped end portions adjustably connected together, as by a clamp screw 14 for example, so that the band may be circumferentially adjusted to suit the user's head.

The frame 12 also includes a pair of arms 15 which are rigidly secured to opposite sides of the headband 13 by bolts or rivets 16 and extend forwardly therefrom. The front ends of the arms 15 carry an episcope type projector 17 which will be hereinafter described. In addition, the frame 12 includes a pair of fractionally adjustable, telescoping arms 18 which are secured intermediate their ends on the bolts or rivets 16, the front ends of these arms being connected by a cross bar 18a carrying a screen 19. The rearwardly extending portions 18b of the arms 18 support a transversely elongated counterweight 20 which is located rearwardly of the headband 13 and serves to balance the entire device on the user's head so that it does not tip forwardly. A bracket 36 is secured to the front of the headband 13 to hold the housing 21 firmly thereon.

The episcope type projector 17 comprises a housing 21 provided in the bottom thereof with a sight opening 22 and equipped with a removable top or cover 23 which constitutes a holder for an object to be viewed, as for example a photograph 24. The latter is slidably inserted in a pair of keeper rails 25 separated by spacers 25a from the underside of the holder 23, and the holder has a set of flanges 26, 27 by which it is removably retained in position on top of the housing 21. Between the flanges 27, the holder is provided with a flat lip 28 which functions as a finger-piece for the holder and also permits the object 24 to be slid into or out of the keeper rails 25. The opposite sides of the housing 21 have downturned flanges 29 to which the forward ends of the aforementioned arms 15 are secured as by bolts or rivets 30.

Illuminating means for the object 24 are provided in the housing 21, such as a pair of lamps 31 held in sockets on the bottom of the housing at opposite sides of the sight opening 22, as shown in FIG. 3. The lamps 31 are in circuit with an inclination-responsive switch 32 which is mounted on the supporting frame 12 and is connected to a suitable source of current, as by an extension cord 33. The switch 32, which may be a mercury switch, is arranged so that the lamps 31 are energized when the user's head is substantially level, but are de-energized when the user tilts his head forwardly and downwardly. A pair of light deflectors 34 are provided on the bottom of the housing 21 between the lamps 31 and the sight opening 22, so that light rays from the lamps are directed upwardly onto the object 24 in the holder 23.

The aforementioned screen 19, which may be either oval-shaped as in FIGS. 2–3 or rectangular as in FIG. 6, comprises a transparent reflecting panel 19a mounted in a frame 19b, the top of the frame 19b having a sleeve positioned on the aforementioned cross bar 18a for supporting the entire screen from the cross bar. The sleeve 35 is frictionally rotatable on the cross bar 18a so that the screen 19 may be angularly adjusted relative to the projector 17 to optically align the screen with the projector and with the user's line of vision, as will be apparent from FIG. 1.

When the device is to be used, the object 24 to be viewed is inserted in the holder 23 and the holder is applied to the top of the projector housing 21. While the user holds his head substantially level, the switch 32 will energize the lamps 31 and the lamps will illuminate the object 24 in the holder 23 and light reflected from the object 24 downwardly through the sight opening 22 will produce an image of the object 24 on the reflecting surface of the transparent screen 19, as indicated at 24a in FIG. 3. This image in turn will be reflected to the eyes of the user, as long as the lamps 31 remain energized. When the user tilts his head forwardly and downwardly, such as in order to view another object on a desk, or the like, the switch 32 will automatically de-energize the lamps 31, the projected image 24a on the screen 19 will disappear, and the user will be able to view the object on the desk directly through the transparent screen 19, for the purpose of comparing, supplementing or otherwise relating the object on the desk to the object 24 in the projector. Thus, by alternately raising and lowering his head, the user will be afforded alternate views of the projected image on the screen 19 and of the object on the desk.

As will be apparent from FIGS. 3 and 5, the object 24 in the holder 23 is inverted and reversed, so that it becomes properly oriented when its image 24a is projected on the screen 19. The screen may be curved or lens-shaped in order to provide some magnification of both the projected image and of the object viewed through the screen.

The transparent reflecting screen 19 is a type well known in the art and may be a transparent plastic sheet having one surface which is reflective when illuminated. The screen 19 when not illuminated by the episcope projector is transparent to the viewer.

While in the foregoing there has been described and shown the preferred embodiment of the invention, various modifications and equivalents may be resorted to within the spirit and scope of the invention as claimed.

What is claimed as new is:

1. A viewing device comprising in combination, a supporting frame adapted to be positioned on the head of a viewer wherein said supporting frame includes means for encircling the head of a viewer, a transparent reflecting screen supported by said frame in the viewer's line of vision, and an episcope-type projector supported by the frame in optical alignment with said screen, said projector including a holder for an object to be viewed and electrical illumination means for the object in said holder whereby an image of the object may be projected on the screen and an inclination responsive electrical switch in circuit with said illuminating means and supported by said frame, said switch being operative to energize the illuminating means when a viewer's head carrying said frame is substantially level, but de-energizing the illuminating means when the viewer's head is tilted forwardly and downwardly.

2. The device as defined in claim 1 wherein said means for encircling the head of a viewer is a headband.

3. The device as defined in claim 2 together with means for circumferentially adjusting said headband.

4. The device as defined in claim 1 wherein said episcope type projector also includes a housing having a bottom provided with a sight opening and also having a removable top which constitutes said object holder, said illuminating means being mounted on said bottom at the sides of said opening.

5. The device as defined in claim 4 together with light deflectors provided on the bottom of said housing between said illuminating means and said opening.

6. The device as defined in claim 1 together with a counterweight carried by said frame at the back thereof remote from said projector and said screen.

7. The device as defined in claim 1 wherein said frame includes means for angularly adjusting said screen relative to said projector whereby to optically align the same with the viewer's line of vision.

References Cited

UNITED STATES PATENTS

| 3,427,730 | 2/1969 | Noxon | 353—13 |
| 3,002,418 | 10/1961 | Mitchell | 353—43 |
| 2,537,996 | 1/1951 | Hankes | 353—14 |

FOREIGN PATENTS

| 350,800 | 7/1937 | Italy | 353—11 |

LEONARD FORMAN, Primary Examiner

A. J. MIRABITO, Assistant Examiner

U.S. Cl. X.R.

353—65, 122